Figure 1:
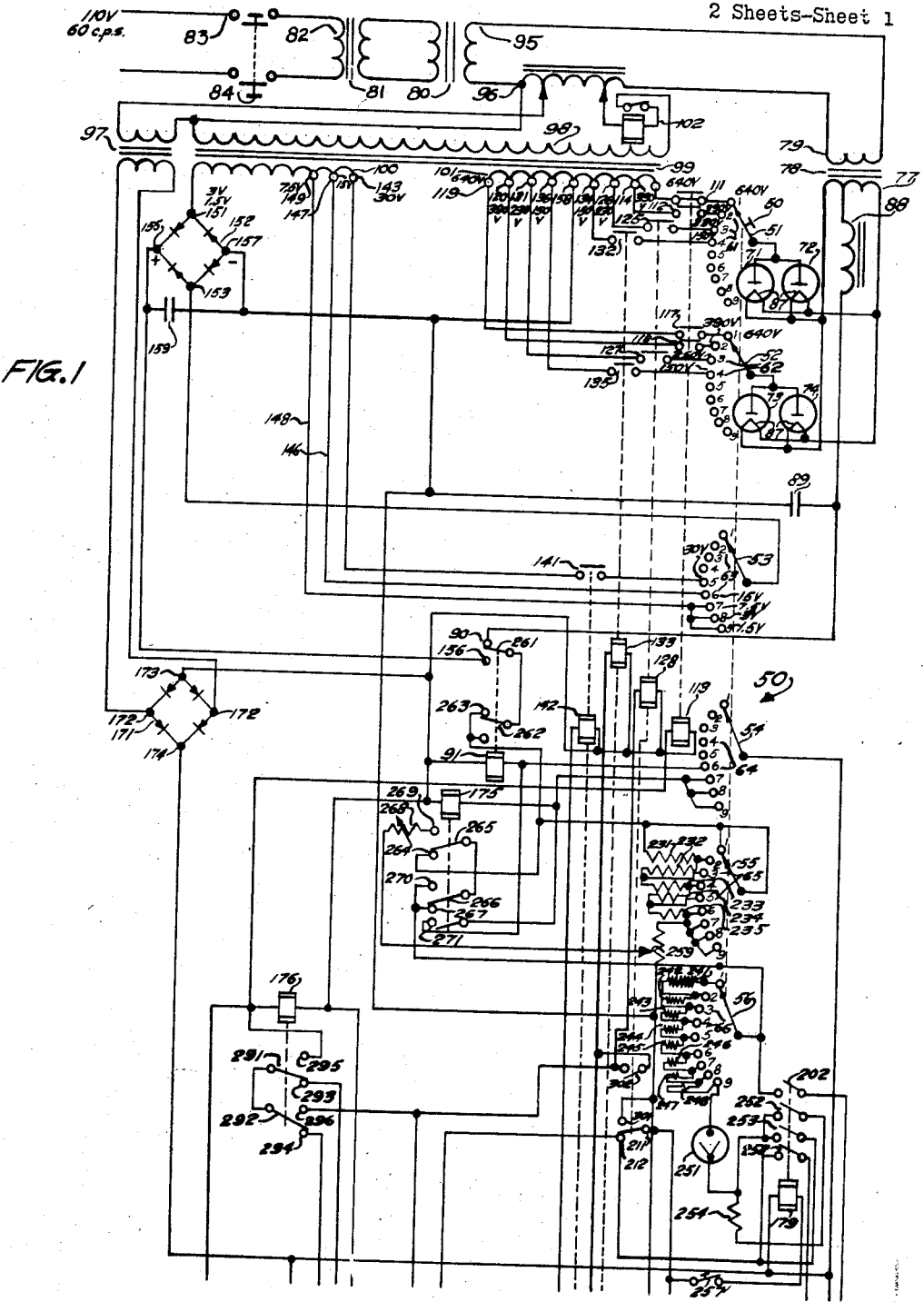

March 10, 1959

A. B. SCHMIDT 2,877,411

APPARATUS FOR ELECTRICALLY TESTING ARTICLES

Filed June 29, 1954

2 Sheets-Sheet 1

INVENTOR
A.B.SCHMIDT
BY C.B. Hamilton
ATTORNEY

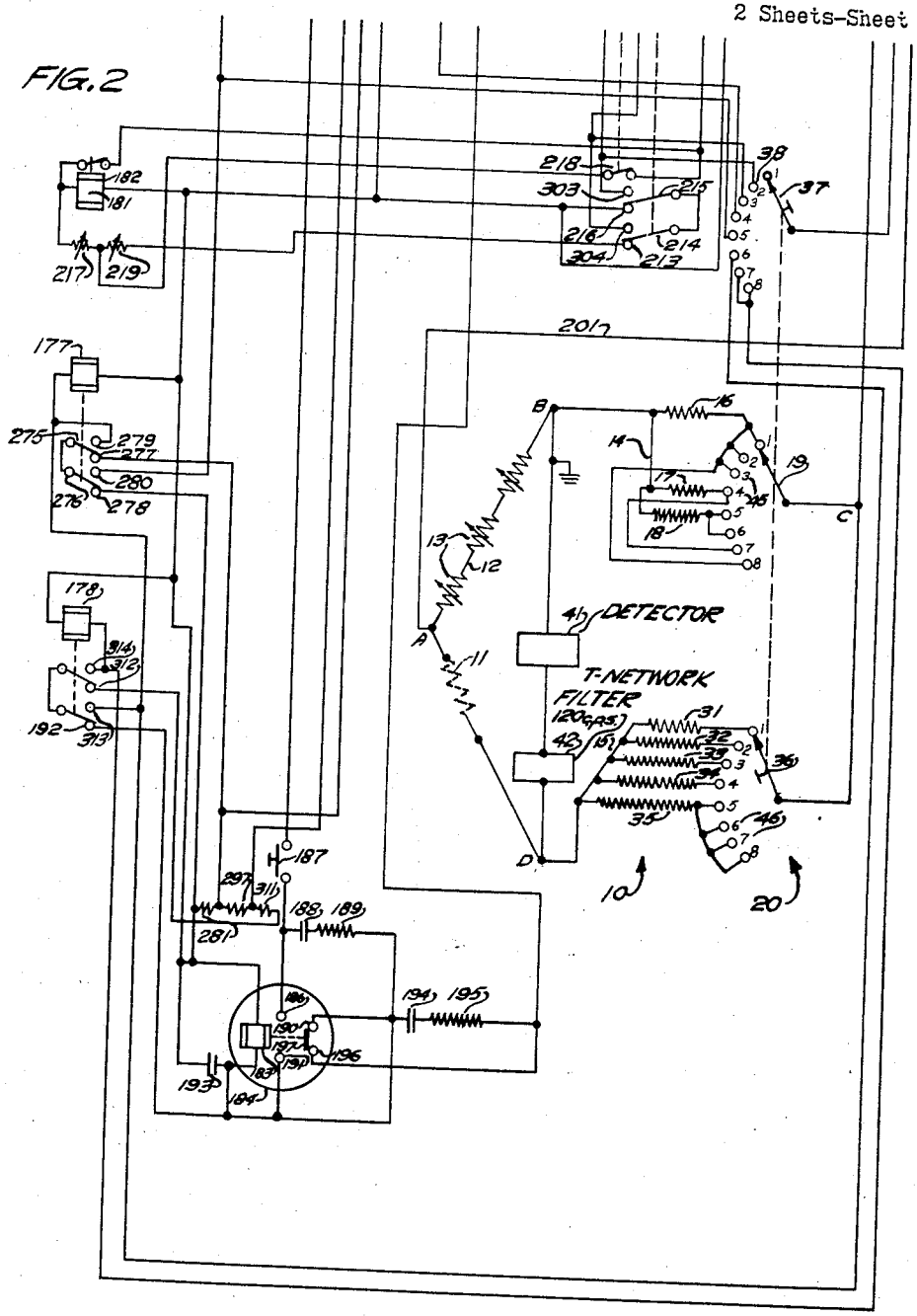

United States Patent Office 2,877,411
Patented Mar. 10, 1959

2,877,411

APPARATUS FOR ELECTRICALLY TESTING ARTICLES

Arthur B. Schmidt, Lombard, Ill., assignor to Western Electric Company, Incorporated, New York, N. Y., a corporation of New York Application June 29, 1954, Serial No. 439,975

9 Claims. (Cl. 324—62)

This invention relates to apparatus for electrically testing articles, and more particularly to apparatus for testing resistors to determine voltage coefficients thereof.

In the manufacture of resistors of precise value, it is sometimes necessary to measure the resistances of the resistors precisely at different voltages for the purpose of computing voltage coefficients thereof. No apparatus has been known in the past for measuring quickly the resistances of resistors precisely at different voltages.

An object of the invention is to provide new and improved apparatus for testing resistors precisely.

Another object of the invention is to provide apparatus for testing resistors over a wide range of voltages.

An apparatus illustrating certain features of the invention may include a Wheatstone bridge circuit for measuring a resistance of a resistor, a variable power supply, and selector switch means for adjusting the bridge and limiting the voltage which can be applied thereto, and selective switch means for applying voltage to the bridge circuit below the limited voltage.

A complete understanding of the invention may be obtained from the following detailed description of an apparatus forming a specific embodiment of the invention, when read in conjunction with the appended drawings, in which Figs. 1 and 2 disclose an apparatus forming one embodiment of the invention, Fig. 1 showing a portion of the control circuit and Fig. 2 fitting into Fig. 1 and showing the remainder of the circuit.

Referring now in detail to the drawings, there is shown therein a Wheatstone bridge circuit 10 for precisely testing a resistor 11 at different voltages to measure the resistances thereof for computing the voltage coefficient thereof. The Wheatstone bridge circuit includes a resistance arm 12 composed of an adjustable resistor 13 and arms 14 and 15 having stepped resistors 16, 17 and 18 in the arm 14 which may be selectively brought in by a contactor 19 of a selector switch 20. The arm 15 includes stepped resistors 31, 32, 33, 34 and 35 which may be brought in selectively by a contactor 36 of the selector switch 20, the contactor 36 being mechanically tied to the contactor 19 and to a contactor 37 associated with the contacts 38 of the switch 20.

Across the BD terminals of the bridge circuit, a detector 41 of a well known type and a frequency filter 42 of a well known type are provided. For applying low voltages to the bridge circuit, the selector switch 20 may be set manually in a position in which the contactors 19, 36 and 37 are in engagement with the No. 1 contacts 45, 46 and 38, respectively, which cuts low resistors 16 and 31 into the bridge circuit 10. For higher voltage tests, the contactors 19 and 36 are moved to the higher numbered contacts of their respective banks of contacts, the resistor 16 being retained in the bridge circuit for contacts 1, 2 and 3, the resistor 17 being brought into the circuit for the number 4 contact 45 and the resistor 18 being brought into the circuit for the number 5 and 6 contacts 45. The number 7 contact 45 brings in the resistor 17 and the number 8 contact 45 brings in the resistor 16 similarly to the contacts 1, 2 and 3. The contactor 36 brings in the resistors 32, 33, 34 and 35 depending on which of the contacts it is connected to, and each of these resistors is ten times the value of the immediately preceding resistor.

The circuit also is provided with a second selector switch 50 having contactors 51, 52, 53, 54, 55 and 56 which are associated with banks of contacts 61, 62, 63, 64, 65 and 66, respectively, the contactor 51 is connected to rectifier tubes 71 and 72, the contactor 52 is connected to rectifier tubes 73 and 74 connected to a secondary winding 77 of a filament transformer 78 having a primary winding 79 supplied with power from a pair of transformers 80 and 81. The contactors 51 and 52 being for selecting high voltage ranges for the tests. The transformer 81 includes a primary winding 82 connected to an A. C. power line 83 having a manually operable switch 84 therein. The center of the secondary winding 77 connected to cathodes 87 of the rectifier tubes is connected by a coil 88 to a capacitor 89 and a contact 90 of a relay 91. A secondary winding 95 of the transformer 80 supplies power also to an auto-transformer 96 to which a transformer 97 is connected and to which a primary winding 98 of a high voltage transformer 99 is connected. The transformer 99 also is provided with secondary windings 100 and 101, and a circuit breaker 102 is provided in series with the winding 98 as a protective device therefor.

Contacts 111 and 112 of a relay 113, when the relay 113 is energized, connect the number 1 and 2 contacts 61 to the righthand end of the secondary winding 101 and to a tap 114 thereof adjacent to the end. Contacts 117 and 118 of the relay 113 connect number 1 and 2 contacts 62 to taps 119 and 120. Contacts 125 connect the number 3 contact 61 to a tap 126 and contacts 127 of a relay 128 connect the number 3 contact 62 to a tap 131 of the winding 101. Contacts 132 of a relay 133 connect the number 4 contact 61 to a tap 134. Contacts 135 of the relay 133 connect the number 4 contact 62 to an end tap 136 of the secondary winding 101.

Contacts 141 of a relay 142 connect the number 5 contact 63 to an end tap 143 of the secondary winding 100 when the relay 142 is energized. The number 6 contact 63 is connected by a conductor 146 to a tap 147, and 7, 8 and 9 contacts 63 are connected by a conductor 148 to a tap 149 on the secondary winding 100. The other end of the secondary winding 100 is connected to an A. C. terminal 151 of a rectifier 152 for supplying low test voltages, an opposite A. C. terminal 153 thereof being connected to the contactor 53 of the switch 50. A positive terminal 155 of the rectifier 152 is connected to a contact 156 of the relay 91 and a negative terminal 157 is connected to a center tap 158 of the secondary winding 101, a capacitor 159 connecting the terminals 155 and 157 together.

The secondary of the transformer 97 supplies A. C. power to a rectifier 171 having A. C. terminals 172, a positive terminal 174 and a negative terminal 173. The terminal 173 is connected directly to one side each of relay windings 113, 128, 133, 142, 91, 175, 176, 177, 178 and 179, and to one side of the winding 181 of a sensitive circuit breaker 182 of a well known type and to one side of a winding 183 of a highly sensitive gas-enclosed relay 184 of a well known type connected as a protective circuit breaker. The positive terminal 174 of the rectifier 171 is connected directly to the contactors 37 and 54 and to a contact 186 of the relay 184 through a manually operable toggle switch 187, one side of the capacitor 188 having a resistor 189 in series therewith is connected to the positive terminal through the switch 187. The other side of the capacitor 188 being connected by the resistor 189 to contact 190 of the relay 184, to a contact 191 of the relay 184, to a contact 192 of the relay 178, and to one side of the winding 183 on one side of a capacitor 193, the other side of which is connected to the negative terminal 173 directly. The resistor 189 also is connected to a capacitor 194 in series with the resistor 195 which is connected to a contact 196 of the relay 184. The relay 184 also is provided with a contact 197 normally in engagement with the contacts 190 and 196 and movable into engagement with the contacts 186 and 191 when the winding 183 is energized sufficiently. The contact 196 and the resistor 195 are connected by a conductor 201 to contacts 202 of the relay 179.

To test a resistor 11 in one of the high voltage ranges, the switch 20 is set in its number 5 position and contactors 51, 52, 53, 54, 55 and 56 of the switch 50 are set on the number 1 contacts. The contactors 51 and 52 connect the full halves of the center tapped winding 101 to the high test voltage rectifier tubes 71, 72, 73 and 74, the contactors 53 and 54 are on dead contacts, the contactor 55 does not shunt any of inversely stepped shunt resistors 231, 232, 233, 234 and 235, and the contactor 56 does not shunt any of inversely stepped calibrating resistors 241, 242, 243, 244, 245, 246, 247 and 248 in series with a voltmeter 251 connected at its other terminal to contacts 252 and 253 of the relay 179 and to a resistor 254 bridging the contacts 252. The relay 179 is energized directly through the D. C. terminals 173 and 174, a manually operable switch 257 being closed to close its contacts, of which contacts 202 and 258 connect voltage to the bridge circuit 10. The full voltage across the resistors 231, 232, 233, 234 and 235 and a voltage divider 259 from tubes 71, 72, 73 and 74 then is applied to the A and C terminals of the bridge 10 through contacts 90, 261, 262, 263, 264, 265, 266, 267 and 202 on the one side of the power supply, and on the other side of the power supply, from the center tap 158, through contacts 301 and 211, the winding 183, the contacts 190, 197 and 196 and contacts 258 of the relay 179 to the C terminal of the bridge.

In order to measure resistors having a range from 2.7 ohms up to and including 22 megohms, eight combinations of the ratio arms 14 and 15 are used, each set of ratios covering approximately a decade, the first being 2 to 9.9 ohms and the last being 10 megohms to 22 megohms. In setting up the bridge to measure a resistor 11 of 15 ohms, the switch 20 is manually rotated to number 2 position for the resistance range in which the nominal value of the test resistor 11 is. In this position, the voltage to the bridge must be limited to a low voltage of approximately 30 volts and the current to .65 ampere in order to protect the bridge 10 against overloads, and only the relay 142 of the voltage-regulating relays 113, 128, 133 and 142 is closed. The contactor 37 applies the output voltage from the rectifier 152 to the relay 142, which closes contacts 141. In this position of the switch 20, all the leads of the winding 101 and the leads to the winding 100, used for obtaining the 30, 15, 7.5, 3 and 1.5 volt ranges, are all connected to the contacts 63 and the rectifier 152. Therefore, the selector switch 50 can connect the bridge 10 only to the lower voltages.

With the relays 113, 128, 133, 176, 177 and 178 de-energized, the current overload relay winding 183 is shorted out by contacts 211 and 212 of the relay 128. The overload circuit breaker 182 is brought into the circuit through contacts 213, 214, 215 and 216 of the relay 133. The short across a resistor 217 is removed when the relay 142 is operated to open contacts 218. The circuit breaker 182 with the shunt 217 and 219 will operate when a current equal to approximately .65 ampere flows through it. Thus, the bridge voltage is limited to 30 volts and the bridge current to .65 ampere. The selector switch 50 then is set in position 5 so that a maximum of 30 volts D. C. may be applied to the bridge 10. A pointer of the auto-transformer 96 then is adjusted to provide the desired first voltage, and is measured by the voltmeter 251.

Then, to obtain the resistance of the resistor 11 at the first voltage, the switch 257 is manually closed and the resistance of the resistor is measured. Then the switch 257 is opened, and the selector switch 50 is moved to position 8 and the voltage divider 259 and a variable resistor 268 are adjusted to obtain the tenth of the initial test voltage on the voltmeter 251, which is the voltage to the contacts 202 and 258 to the bridge. Then the switch 257 is closed and the resistance of the resistor 11 under this fractional voltage may be obtained, and, from the two resistance values measured, the voltage coefficient may be computed.

While the switch 50 is in its number 8 position, the shunting or voltage steadying resistors 231, 232, 233, 234 and 235 are shunted out, the scale controlling resistors 241, 242, 243, 244, 245, 246 and 247 are shunted out, the relay 175 is energized to open contacts 264 and 265 and contacts 266 and 267 and close contacts 265 and 269 and contacts 266 and 270. Then voltage from only the portion of the winding 100 between the left end of the winding 100 and the tap 149 is applied to the test voltage rectifier 152, the relay 91 is energized through contacts 271 of the relay 175 to break the circuit from the high test voltage rectifier tubes 71, 72, 73 and 74 and connect the low test voltage rectifier 152 into the circuit. Thus, the relay 91 is energized to block the high test voltage whenever the switch 50 is in any of the number 5, 6, 7, 8 and 9 positions, the low test voltage positions.

When the switch 20 is set in position 6, the contactor 37 brings in the relay 177 to move contacts 275 and 276 from contacts 277 and 278 to contacts 279 and 280, respectively, to open a shunt circuit of a resistor 281 and energize relays 113 and 176. The relay 113 closes contacts 111, 112, 117 and 118 to permit the use of high test voltage ranges of 640 v. and 390 v. maximum to be used by positions 1 and 2 of the switch 50. The relay 176 moves contactors 291 and 292 from contacts 293 and 294 to contacts 295 and 296 to remove a shunt of a resistor 297 and connect power to the relay 128. The relay 128 closes contacts 125 and 128 to make 230 v. available to the bridge, if desired, opens contacts 211 and 212 to take out a shunt of the high voltage circuit breaking relay 184, closes contacts 211 and 301 to the center tap 158 of the winding 101, and closes contacts 302 to energize the relay 133. The relay 133 closes contacts 132 and 135 to make the 150 v. D. C. maximum range available, if desired, opens contacts 213 and 214 and 215 and 216 to cut out the low voltage low current circuit breaker 182, closes contacts 215 and 303 and 214 and 304 to energize the relay 142. The relay 142 closes the contacts 141 to make 30 v. D. C. maximum range available for test and opens contacts 218 to cut out the shunt of the resistor 219.

When the switch 20 is in either of the number 7 and 8 positions, the relay 178 is energized to break contacts 192 and 312 to take a resistor 311 out of shunt to winding 183 and make contacts 313 and 314 to bring in the relay 177, which in turn brings in all the relays 176, 113, 128, 133 and 142. When the switch 20 is in position 2, the relay 142 is the only test voltage relay energized, and, while in position 3, only the relays 133 and 142 are energized. In position 4 of the switch 20, only the relays 128, 133 and 142 of the test voltage relays are energized, and, in position 5, the test voltage relays 113, 128, 133, 142 and 176 are all energized. Thus, the switch 20, according to its position setting the arms 14 and 15 of the bridge 10, makes only test voltages not damaging to the portions of the bridge components in the bridge circuit available. In position 1 of the switch 20, only the lower voltage ranges are available for test, only the rectifier 171 is operative for test voltage, the circuit breaker 182 is in the power supply to the bridge and the high test voltage circuit breaker 184 is cut out of the circuit.

When a resistor of 22 megohms is to be measured, the switch 20 is rotated to the position marked with the resistance range in which the nominal value of the test resistor is. In this case, the voltage to the bridge is the full range of the power supply voltage, 640 volts, and the current should be limited to approximately 4 ma. The switch 20 in position 8 connects the output voltage of rectifier 152 to the relay 178, which closes a circuit through its contacts so that voltage from the rectifier 171 is applied to the relay 177 and in a similar manner, relays 113, 176, 128, 133 and 142 are energized seriatim. In this arrangement, all the secondary leads of the transformer 99 are connected through closed circuits to the switch 50. Therefore, when the voltage selector switch 50 is rotated through its first five ranges, voltage will be obtainable on all of them.

With relay 128 energized, the current overload circuit breaker 182 is shorted out, and the circuit breaker 184 is brought into series with the power supply to the bridge circuit 10. Current flowing through the bridge 10 then will flow through the coil 183. If the current exceeds 4 ma, the relay will operate. This will open the circuit to the bridge at contacts 190, 196 and 197 and also stop the current flowing through the coil 183 of the relay 184. However, immediately after contacts 190, 196 and 197 are opened, contacts 197, 186 and 191 are made. This closes the circuit from the output of the rectifier 152 to the coil 183, and sufficient current from the rectifier 152 to hold the relay 184 in the operate position is supplied.

The above-described apparatus precisely tests resistors for voltage coefficients. It is rapidly adjustable to provide the two voltages for each resistor, protects the bridge circuit at all times and is rapidly adjustable for resistors of widely varying resistances.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A testing apparatus, which comprises a transformer having a secondary winding provided with a plurality of taps, a test bridge circuit having a plurality of resistances connected thereto, a rectifier, a plurality of relays each having contacts connected in series between one of the taps and the rectifier, selector switch means connected in series between the contacts and the rectifier for connecting selected ones of the taps to the rectifier, second selector switch means for connecting predetermined ones of said resistances in the bridge circuit to the rectifier, and a plurality of relay energizing circuits individually operated by the second selector switch means for selectively energizing the relays.

2. A testing apparatus, which comprises an adjustable voltage source having a plurality of taps for providing a plurality of different voltage ranges, a bridge circuit having a plurality of resistances connected thereto, a rectifier, a plurality of relays having normally open contact means between the taps and the rectifier, switch means for connecting predetermined resistances to the rectifier, means controlled by said switch means for actuating the relays selectively, second selector switch means having contacts in series between the normally open contact means and the rectifier means for rapidly changing the voltage range applied to the bridge circuit, a voltmeter, means for adjusting the scale of the voltmeter, and means operable by the second selector switch means for operating the adjusting means to change the scale of the voltmeter in accordance with the voltage range being applied to the bridge circuit.

3. A testing circuit, which comprises a voltage supply transformer having a secondary winding provided with a plurality of taps spaced therealong, variable means for adjusting the voltage applied to the transformer, a bridge circuit having a bank of resistances connected thereto, a rectifier for supplying power from the secondary winding to the bridge circuit, a series of relays having normally open contacts in connected series between the rectifier and each tap of the secondary winding, means interconnecting the relays in cascade for energization by one another, selector switch means interposed between the bridge circuit and the rectifier connecting different resistances therebetween, energizing circuits selectively operated by said selector switch means for energizing the relays selectively, and second selector switch means having contacts in series between the rectifier and the contacts of the relays for rapidly adjusting the voltage connected to the rectifier.

4. An apparatus for testing resistances under different voltages, which comprises a voltage source, a high voltage rectifier, a low voltage rectifier, a bridge circuit having a first group of resistances associated with the high voltage rectifier and a second group of resistances associated with the low voltage rectifier, selectively operable means for connecting the high voltage rectifier to the voltage source and the bridge circuit when in one position and connecting the low voltage rectifier to the voltage source and the bridge circuit when in a second position, means operable by the selectively operable means for connecting different resistances in the bridge circuit in accordance with which rectifier is connected thereto, a high current circuit breaker, a low current circuit breaker, and means operable by the selectively operable means for selectively connecting the low current circuit breaker between the bridge circuit and the low voltage rectifier and the high current circuit breaker between the high voltage rectifier and the bridge circuit when the respective rectifiers are connected to the bridge circuit.

5. A testing apparatus, which comprises a bridge circuit, a transformer having a primary winding and a secondary winding provided with a plurality of taps spaced therealong, means for energizing the primary winding, a high voltage rectifier, a low voltage rectifier, relay means normally connecting the high voltage rectifier to the bridge circuit operable when energized for disconnecting the high voltage rectifier from the bridge circuit and connecting the low voltage rectifier to the bridge circuit, a plurality of relays having normally open contacts between and interconnecting the rectifiers and the taps, a bank of resistances connected to the bridge circuit, selector switch means having a bank of contacts for selectively connecting said resistances to said relay means and a second bank of contacts for actuating the relays selectively to apply selected voltages to the bridge circuit, and second selector switch means having a first bank of contacts in series between the relay contacts and the rectifiers and a second bank of contacts having a selected one connected to the relay means for energizing the relay means.

6. In a circuit for applying test voltages to a test circuit, a plurality of different voltage sources, a first selector switch having two groups of contacts, a first group of relay means adapted to selectively connect a first group of contacts to a first group of voltage sources, a second group of relay means adapted to selectively connect a second group of contacts to a second group of voltage sources, a selector switch means connected to said test circuit, a contactor means included in said first selector switch for selectively connecting the contacts to said second selector switch, means operated by said second selector switch for selectively energizing said relay means to apply different voltages to said bridge circuit, a first current limiting means rendered effective by said second selector switch when the first group of voltages is applied to said bridge circuit, and a second current limiting means rendered effective by said second selector switch when the second group of voltages is applied to said bridge circuit.

7. In a circuit for applying different test voltages to a bridge circuit, a plurality of different voltage sources, a first rectifier means associated with a first group of said voltage sources, a second rectifier means associated with a second group of said voltage sources, a first selector switch having a contactor means connected to both said rectifiers, said first selector switch having a first bank of contacts associated with the first group of said voltage sources and a second bank of contacts associated with the second group of said voltage sources, normally unoperated relay means for selectively connecting said voltage sources to said contacts, a second selector switch for selectively energizing said relay means to selectively energize said rectifiers in accordance with the different voltage sources, and means within the second selector switch for connecting the outputs of the energized rectifiers to said bridge circuit.

8. In a circuit for applying different test voltages to a bridge circuit as defined in claim 7 including a first current limiting means, a second current limiting means, means operated by the second selector switch connecting the first rectifier to the bridge circuit for connecting said first current limiting means to the output of said first rectifier, and means operated by the second selector connecting the second rectifier to the bridge circuit for connecting said second current limiting means to the output of said second rectifier.

9. In a test circuit for applying different voltages to a bridge circuit, a transformer means having a secondary winding provided with a plurality of spaced taps, a first rectifier circuit, a second rectifier circuit, a first selector switch having contactor means connected to both said rectifiers, said selector switch having a plurality of contacts, a first group of circuit means having normally open relay contacts interconnecting a first group of taps with a first group of contacts in said first selector switch, a second group of circuit means having normally open relay contacts interconnecting a second group of taps with a second group of contacts in said selector switch, a first group of relays for operating said first group of relay contacts, a second group of relays for operating said second group of relay contacts, and a second selector switch having a contactor means engageable with a set of contacts in said bridge circuit for selectively energizing relays in said first group to connect in conjunction with the operation of said first selector switch the first rectifier with said bridge circuit, a second set of contacts in said bridge circuit engageable by said contactor for selectively energizing relays in said second group to connect in conjunction with the operation of said first selector switch the second rectifier with said bridge circuit.

References Cited in the file of this patent

UNITED STATES PATENTS

| | | |
|---|---|---|
| Re. 17,230 | Travers | Mar. 5, 1929 |
| 1,550,906 | Knopp | Aug. 25, 1925 |
| 2,095,773 | Taliaferro | Oct. 12, 1937 |
| 2,172,034 | Raschdowitz | Sept. 5, 1939 |
| 2,421,227 | Watson et al. | May 27, 1947 |